United States Patent [19]

Lesky et al.

[11] Patent Number: 4,912,414

[45] Date of Patent: Mar. 27, 1990

[54] INDUCTION-TYPE METAL DETECTOR WITH INCREASED SCANNING AREA CAPABILITY

[76] Inventors: Edward S. Lesky, 189 Eden Ave., Satellite Beach, Fla. 32937; Alan J. Reid, 808 Kara Cir., Rockledge, Fla. 32955; Wilton E. Bushong, 2117 Harrison St., Titusville, Fla. 32780; Duane P. Dickey, 1049 Bellefonte Ave., Cocoa, Fla. 32922

[21] Appl. No.: 264,107

[22] Filed: Oct. 28, 1988

[51] Int. Cl.⁴ .............................................. G01V 3/11
[52] U.S. Cl. ...................................................... 324/329
[58] Field of Search ................................ 324/326–329, 324/330, 332, 334, 344, 207, 208, 226, 227, 234, 236, 239, 244, 253–260

[56] References Cited

U.S. PATENT DOCUMENTS

| | | | |
|---|---|---|---|
| 3,002,262 | 10/1961 | Demopoulos et al. | 29/155.5 |
| 3,020,470 | 2/1962 | Shawhan et al. | 324/329 |
| 3,652,928 | 3/1972 | Mansfield | 324/34 R |
| 3,662,255 | 5/1972 | Garrett | 324/328 |
| 3,875,497 | 4/1975 | Madsen | 324/326 |
| 3,882,374 | 5/1975 | McDaniel | 324/329 |
| 3,942,105 | 3/1976 | Bondarenko et al. | 324/34 R |
| 4,006,481 | 2/1977 | Young et al. | 324/329 X |
| 4,021,725 | 5/1977 | Kirkland | 324/326 |
| 4,255,711 | 3/1981 | Thompson | 324/329 |
| 4,293,816 | 10/1981 | Johnson | 324/329 |
| 4,345,208 | 8/1982 | Wilson | 324/329 |
| 4,552,134 | 11/1985 | Binard | 128/1.5 |
| 4,618,823 | 10/1986 | Dahlheimer et al. | 324/207 |
| 4,623,877 | 11/1986 | Buckens | 340/572 |
| 4,648,041 | 3/1987 | Tarr | 324/259 X |

Primary Examiner—Reinhard J. Eisenzopf
Assistant Examiner—Warren S. Edmonds

[57] ABSTRACT

A metal detector includes a detector head having a primary or transmit coil for the transmission of electromagnetic radiation therefrom, and having a plurality of secondary or receiving coils associated therewith for having voltages induced therein by transmissions from said primary coil. The presence of metallic objects within the detector head affects the voltage level induced in the secondary coils, a condition which may be detected as indicative of such presence of metallic objects. Each detector head preferably includes a primary coil about the periphery thereof, with a plurality of secondary coils, all in the same plane with the primary coil, situated axially in from the periphery of the detector head in a mutually non-overlapping configuration, preferably about the center of such detector head. A plurality of such detector heads may be supported in co-planar alignment by a common non-metallic support structure for scanning relatively larger areas at a time. The primary coil of each respective detector head may be sequentially pulsed and selectively spaced to avoid interference with adjacent detector heads, thereby avoiding certain inherent disadvantages in applying conventional single detector head frequency-dependent tuned coil technology to multiple head use in an integral metal detector system.

19 Claims, 2 Drawing Sheets

INDUCTION-TYPE METAL DETECTOR WITH INCREASED SCANNING AREA CAPABILITY

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention in general concerns an improved metal detector, and in particular concerns an induction-type metal detection system with a particular detector head coil configuration suitable to be adapted for use with single or multiple head embodiments. Supporting electronic circuitry for use with either single or multiple head embodiments forms additional aspects of the present invention.

Heretofore, numerous coil configurations and detector head arrangements have been known for metal detector devices. One generally well-known basic approach to transmit/receive coils (i.e. primary/secondary coils) involves a three coil arrangement, wherein one transmit coil is operatively associated with two receive coils which are wired in opposition to one another. Basic detection principles of such three coil configurations are also well known to those of ordinary skill in the art.

Examples of such three-coil detector head configurations may be found in McDaniel (U.S. Pat. Nos. 3,882,374; see FIG. 2 and column 2, lines 49–53); Mansfield (U.S. Pat. No. 3,652,928; see the Figure and column 2, lines 20–24); Binard (U.S. Pat. No. 4,552,134; see FIG. 3 and column 3, lines 20–23); Bondarenko et al. (U.S. Pat. No. 3,942,105; see FIG. 2 and column 2, lines 43–45); and Demopoulos et al. (U.S. Pat. No. 3,002,262; see FIG. 1 and column 1, lines 17–24). In general, the disclosures of such patents, and particularly with respect to their electronic circuitry for detection of metal objects and the operating principles thereof, are incorporated herein by reference.

All of the foregoing patents are generally directed to a single detector head arrangement, whether the coils thereof are situated in a co-planar arrangement (i.e. common plane) or not. For example, FIG. 3 of Binard (U.S. Pat. No. 4,552,134) clearly illustrates that radiating coil 6 thereof is in a different plane from the pair of receiving coils 7. As clearly illustrated by such FIG. 3 of Binard, non-planar arrangements can be bulky and require additional (perhaps critical) space.

McDaniel (U.S. Pat. No. 3,882,374), while showing a co-planar arrangement of three coils in FIG. 2 thereof, illustrates another non-co-planar arrangement in its Prior Art FIG. 1. In such Prior Art figure, five coils (one transmit and four receive) are situated in two separate planes. In both embodiments, (the Prior Art FIG. 1 and his inventive FIG. 2), McDaniel provides receiving coils which are at least in part disposed outside the periphery of his transmitting coil.

In addition, prior single detector head systems are in general not well suited nor readily adapted for use in multiple head configurations so as to increase the scanning area for a metal detection system. For example, a single head unit consisting of a three foot by three foot detector head only covers a nine square foot area at a time. If such detector head were repeated in a one by eight array, with each head still measuring three feet by three feet, then such a multiple head detector could cover a 72 square feet scanning area at a time providing tremendous advantages over the single head unit, particularly whenever large scale scanning operations are undertaken.

However, as alluded to above, a single head detector using for example a tuned coil concept (well known to those of ordinary skill in the art) does not lend itself to such multiple head use. In general, with a tuned coil concept detector head, once the coil is tuned it will stay tuned until some form of metallic material affects the coil and the coil becomes detuned which causes a voltage rise in secondary coils thereof. Such a voltage rise is indicative of the presence of metallic material within the field of the detector head. One particular short-coming or disadvantage in attempting to apply the tuned coil technology to multiple detector heads is that each detector head would necessarily have to be tuned to a different frequency in order to avoid interference with adjacent detector heads. If eight heads were used in a single detection system, then a relatively large bandwidth would be required.

Hence, such prior technology in general is undesirable for (or in some cases practically incapable of use in) multiple head metal detector systems.

SUMMARY OF THE INVENTION

The present invention recognizes and addresses various drawbacks in prior metal detector devices and systems, such as those shortcomings mentioned above and others. Accordingly, it is one general object of the present invention to provide an improved metal detector device. It is a more particular object of the present invention to provide such an improved device which may in alternative embodiments be practiced in a multiple head configuration, for providing an induction-type metal detection system for scanning relatively large areas at a time.

It is another general object of the present invention to provide an improved metal detector, for use in single or multiple head embodiments, having in particular an improved planar detector head with a specific configuration for the primary and secondary coils thereof.

It is yet another object of the present invention to provide an improved multiple head metal detector system for replacement of single head metal detectors, particularly whenever relatively larger scanning areas are involved. It is a more particular object of the present invention to provide such a improved multiple head metal detector system which avoids operational interference among the multiple heads thereof. It is a further particular object to provide such an improved multiple head detection system which possesses a desired level of sensitivity to scanned metallic objects while enabling considerable reduction in time and money costs by increased scanning rates due to the increase scanning area thereof.

While various features in accordance with the present invention may be collected in different alternative combinations to provide given embodiments of this invention, particular exemplary embodiments of the present invention are disclosed herewith. For example, one such exemplary embodiment concerns an induction-type metal detector apparatus, comprising a primary coil; transmit circuit means connected to the primary coil for controllably outputting electromagnetic radiation therethrough; a plurality of secondary coils, disposed within the vicinity of such primary coil, and having voltages induced therein by electromagnetic radiation from such primary coil; receive circuit means, connected to the secondary coils, for detecting differences between voltage levels induced in the secondary coils and a predetermined reference voltage level, such difference being due to and indicative of the presence of metallic objects in the vicinity of the apparatus; and support means for supporting the primary coil and the secondary coils substantially in a common plane with all secondary coils being disposed within the periphery of the primary coil, and in a mutually non-overlapping configuration.

The transmit circuit means of such exemplary metal detector apparatus may alternatively further particularly comprise an excitation voltage source providing an excitation voltage; an oscillator signal source providing an oscillator signal; and modulation means for modulating the excitation voltage with the oscillation rate from such oscillator signal to provide a modulated drive signal for driving the primary coil.

Receive circuit means of such exemplary metal detector apparatus may also alternatively further particularly comprise amplifier means for amplifying voltages induced in the secondary coils; rectifier means for rectifying such amplified voltages from the amplifier means; comparator means, including a predetermined reference voltage level associated therewith, for comparing such reference voltage level with such amplified, rectified voltage levels from the rectifier means based on voltage levels induced in the secondary coils; and driver means, operatively associated with the comparator means, for outputting at least one sensing signal indicative of voltage level differences detected by the comparator means exceeding a predetermined amount, the sensing signal further being indicative of variations in the voltage level induced in the secondary coils relative a constant output level of the primary coil due to the interfering presence of metallic objects around the fields between the primary coil and the secondary coils.

Yet another exemplary construction comprising an embodiment in accordance with the present invention concerns a multi-head metal detector device comprising an array of plural transmit-sense heads, each head having respective transmit and sense winding portions; transmit circuit means for controllably pulsing respective transmit winding portions for each of such heads; sensing circuit means for obtaining, processing, and outputting signals from the sense winding portions of each respective head induced therein by their respective transmit winding portions; and comparator circuit means for comparing the signals output from the sensing circuit means for each of the respective heads with a predetermined reference signal, and for indicating differences of a predetermined amount therebetween, which differences are caused by the presence of metal objects within the vicinity of each respective head resulting in partial disruption of transmissions between a given transmit winding portion and its respective head sense winding portion; wherein each of the heads is substantially planar, and has the transmit winding portion thereof generally about its periphery, with the sense winding portion thereof within such periphery; and wherein such sense winding portion includes at least four respective sensing windings disposed in a mutually non-overlapping configuration within the plane of their respective head.

Still another exemplary embodiment of this invention is directed to a multi-coil, multi-head pulse induction metal detection system, comprising generally non-metallic support structure for supporting an array of a plurality of substantially planar detector heads in co-planar alignment, each such detector head having a primary coil disposed within its plane and about the periphery thereof for transmitting signals therefrom upon being pulsed, and a plurality of secondary coils also disposed within its plane for receiving signals transmitted from its respective primary coil, such secondary coils being symmetrically supported about the center of their respective detector head axially inward from its periphery and without overlapping one another; sequential transmit means for sequentially pulsing the primary coil of each respective detector head in discrete pulse time periods so that there is no overlap of pulse time periods for the respective heads; and secondary coil sensor means, operatively associated with the detector heads, for indicating differences between signals received by secondary coils of each respective detector head and a predetermined reference signal, such differences indicating the presence of metallic objects relatively near such detection head; wherein the co-planar alignment of the detector heads is generally in a $1 \times n$ array of such heads, with n being the number of such heads, whereby in general a relatively large area may be scanned at a given time across the n width of said array.

Numerous modifications and variations to presently disclosed features and characteristics of the present invention will be apparent to those of ordinary skill in the art. Such modifications may also include the substitution of functional equivalents or the like for the specific structures and features illustrated and discussed, as well as the reversal of various such features. All such modifications and variations are intended to come within the spirit and scope of the present invention by virtue of present reference thereto.

BRIEF DESCRIPTION OF THE DRAWINGS

A full and enabling disclosure of the present invention, including the best mode thereof, is set forth below in conjunction with reference to the accompanying drawings, in which.

Repeat use of like reference characters throughout the present specification and accompanying drawings is intended to represent same or analogous features or elements of the present invention.

DETAILED DESCRIPTION OF THE PREFERRED EMBODIMENTS

Figure 1:
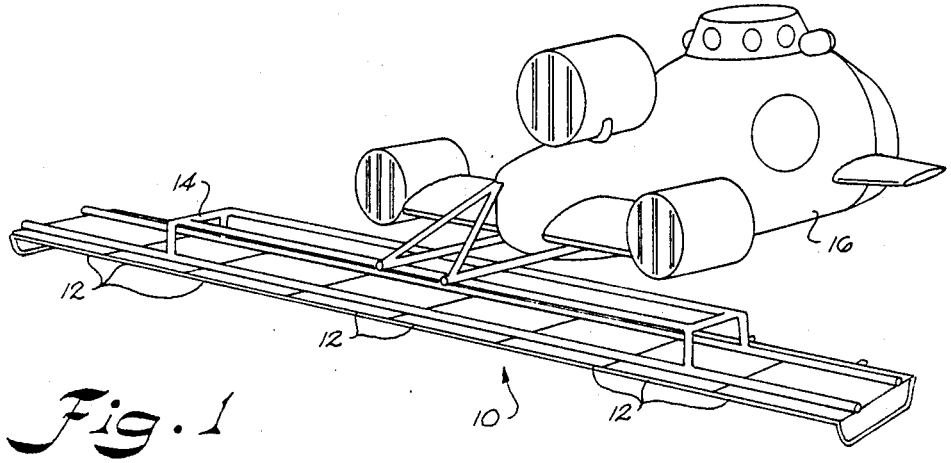
FIG. 1 illustrates an exemplary multi-head metal detector system in accordance with the present invention, being carried on a powered vehicle for movement therewith.

In general, the present invention may be practiced in single head or multiple head configurations, and within or without a liquid environment. However, the presently preferred exemplary embodiment include a one by eight array of eight detector heads or transmit-sense heads in accordance with the present invention, in coplanar arrangement. FIG. 1 illustrates such a preferred array 10 of a plurality of detector heads 12 supported on a preferably non-metallic support structure or means 14. Such support structure is in turn mounted on a driven or powered vehicle, such as the submersible 16, for movement therewith. Alternatively, of course, array 10 would be supported from a surface vehicle (with cables or the like), or used on land wit various land vehicles. In any event, in general, the electronics of FIG. 4 (discussed below) are shielded from any water contact though primary or secondary coils of a detector head can generally tolerate some water contact.

Present FIG. 1 is intended as a generalized representation of various arrays, preferably all coplanar arrangements, of plural detector heads in an integral detector system in accordance with the present invention. Though a one by eight array is illustrated, other numbers of detector heads may be used in a one by n (n being the number of detector heads) configuration, or other arrangements having both multiple rows and columns. All such embodiments in accordance with the present invention provide relatively improved (i.e. enlarged) scanning areas through provision of multiple heads.

Further in conjunction with various sequencing means operations for each respective detector head 12 (discussed in greater detail below), adjacent such detector heads preferably are slightly separated by at least six inches or the like. Such configuration, as well as such sequenced operation, generally prevents any interference of metallic object detection sensing between adjacent detector heads. Of course, particular side separations less than six inches, or even greater than six inches, may be practiced, depending on the precise details of a given embodiment in accordance with the present invention.

If in a given prior art detector a detector head thereof comprised a square measuring only 3 foot on each side, then only 9 square feet could be scanned at a time. However, if each detector head 12 of the one by eight array of present FIG. 1 comprises a square measuring approximately 3 feet on each side, then the cumulative scanning area square footage of such a metal detector system in accordance with the present invention would be 72 square feet (8 times greater than the prior art single detector head system).

Figure 2:
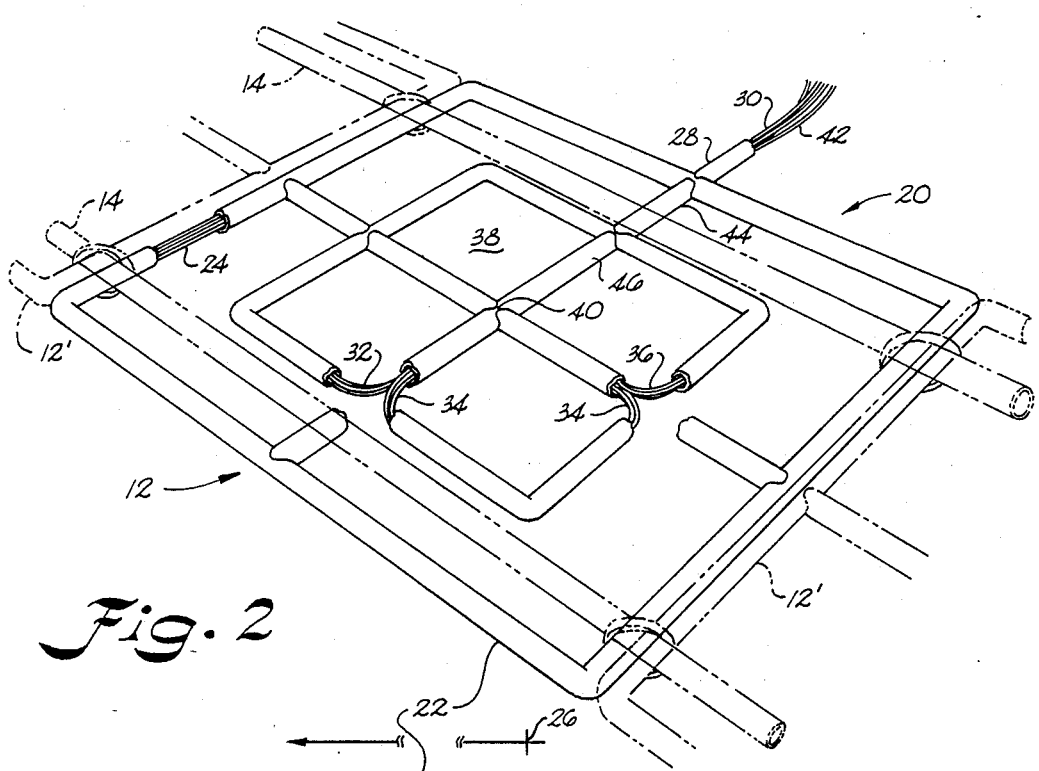
FIGS. 2 and 3 illustrate a partial-cut-away perspective view and a top elevational view, respectively, of a single detector head in accordance with the present invention, such as illustrated in multiple use in embodiment of present FIG. 1.
Figure 3:
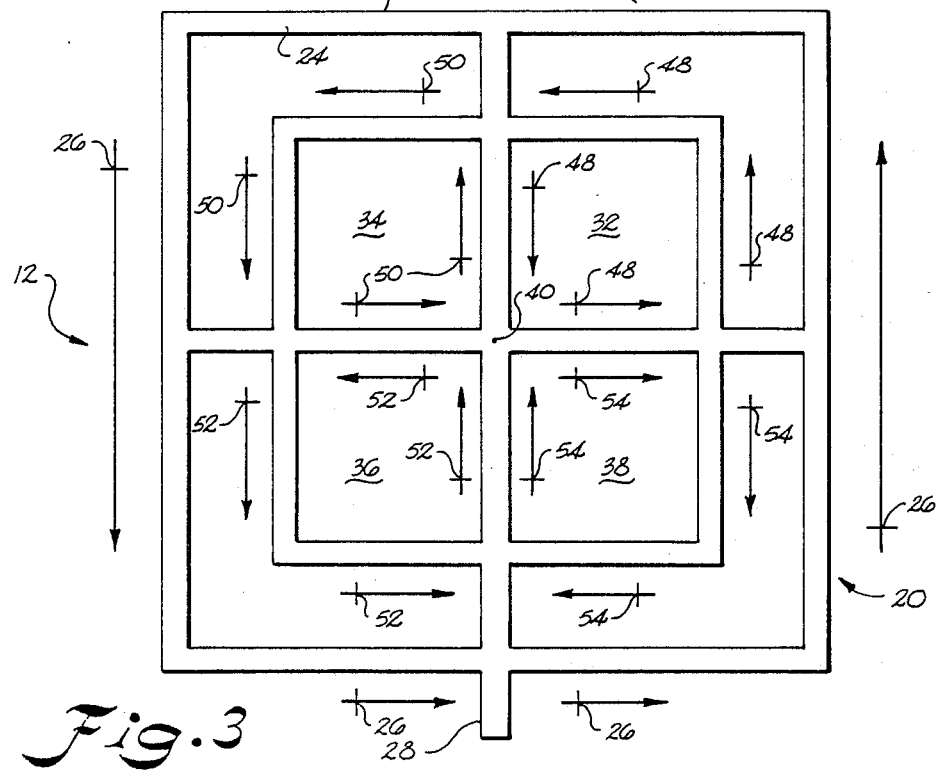

Whether a single head or multiple head embodiment is practiced, each transmit-sensing head (i.e. detector head) thereof preferably includes primary and secondary coil structure as represented by present FIGS. 2 and 3. FIG. 2, in general, illustrates a perspective view of a detector head 12 (solid line illustration) variously attached to support structure runners 14 (dotted line), also adapted for simultaneously supporting additional detector heads 12' (dotted line) in co-planar alignment with planar detector head 12. FIG. 3 also illustrates a side or plan elevational view of detector head 12 of present FIG. 2.

In the presently preferred exemplary embodiment, the primary and secondary coils of a detector head 12 are supported in generally non-metallic support structure 20 comprising a planar member which is preferably square. Though the present invention may be practiced within or without a water environment, preferably plastic materials such as PVC pipe 22 is generally used, with various wiring and coils received in a water-tight seal therewithin (see FIG. 2). Alternative preferably non-metallic materials may be used for such support structure, as well as alternative structural configurations so that actual tubing is not required. In other words, some alternative structure may be utilized in which various coils of each detector head 12 are not encased within tubing or the like.

In general, the present invention utilizes a primary or transmit coil 24 which is received about the periphery of planar, square detector head 12. Primary coil 24 is in the present exemplary embodiment a square which traverses the entire periphery of detector 12, and is connected for current flow along such periphery in a selected direction such as represented by arrows 26 (see FIG. 3). Connection for providing drive signals from a transmit circuit means or the like (discussed below with reference to FIG. 4) may be made through a connecting element 28 via wiring 30. Wiring 30 enters the periphery of detector head 12 through connecting element 28, and traverses such periphery within the PVC piping forming such periphery.

Secondary or receiving coils are also associated with each detector head 12 in the plane thereof. Such coils have voltages induced therein by their respective primary coil associated with such detector head, as understood by those of ordinary skill in the art. As represented by present FIGS. 2 and 3, preferably four secondary coils 32–38 are provided for each detector head 12. In such configuration, the respective secondary or receive coils are mutually non-overlapping, while being symmetrically disposed about the center 40 of detector head 12, as is the primary coil 24 thereof. However, the secondary coils are in general preferably received axially within from the periphery of detector head 12, and thus within the periphery of its respective primary coil 24.

Separate wiring 42 also entering through connecting member 28 interconnects receive circuit means with each of the secondary or receiving coils 32–38. Preferably, such coils are connected in parallel such that three of the coils (in this embodiment: coils 32–36) are aiding primary coil 24 and one of the coils (in this embodiment: coil 38) is opposing such primary coil. Interconnection at central point 40 further connected with wiring 42 through central elements 44 and 46 of support structure 20 provides for such parallel connections.

Arrows 48–54 (FIG. 3) represent the abovementioned parallel connections wherein three coils (32–36) aid primary coil 2 (see arrows 26 thereof), while one coil (coil 38) opposes the direction arrows 26 of primary coil 24. Such a connection scheme for the secondary receiving coils 32–38 ensures that a signal signature is established for positively indicating the presence of metal objects within the vicinity of detector head 12. In other words, different additive and negative voltage levels result for the respective left and right hand sides of detector head 12 as metallic objects enter the vicinity thereof from, for example, top to bottom.

Of course, in general, during operation of a detector system incorporating one or more of detector heads 12, the detector system itself is moved together with a powered vehicle (such as submersible 16 of present FIG. 1) for obtaining relative motion between detector heads 12 and metallic objects to be detected.

The sensitivity of a metal detector system in accordance with the present invention may be varied through different methods. For configurations similar to FIG. 1 (i.e. a 1×8 array), a three inch by three inch metallic box may be detected for example 17 inches from the front of a transmit-sense head 12, and a 7×12 inch box may be detected up to 24 inches away from such head, where each primary coil has 25 turns of AWG 18 wire, and each secondary coil has 50 turns each of AWG 26 wire. In general, decreasing the coil windings ratio increases the sensitivity of the resulting metal detection system (i.e. the better the match between transmit and sense coils, the greater the sensitivity of the system). Altering coil gauges also affects sensitivity.

Figure 4:
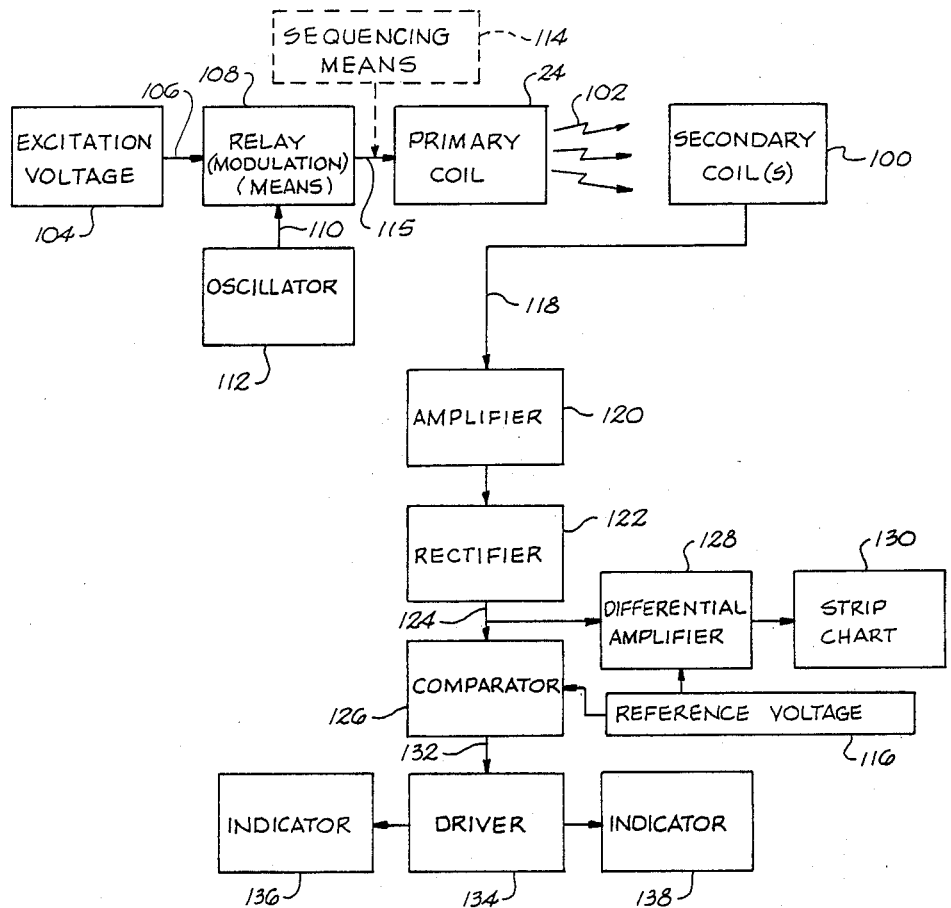
FIG. 4 illustrates in block diagram exemplary circuitry in accordance with the present invention for operation with the detector head coils, all as discussed in greater detail hereafter.

Referring to FIG. 4, block diagram representations of specific exemplary circuitry are illustrated for exciting or driving a primary coil 24 and for obtaining signals from its respective secondary coil or coils 100.

In general, a transmit circuit means is connected to a primary coil 24 for controllably outputting electromagnetic radiation 102 therethrough, for inducing a voltage level in secondary coils 100. Such transmit circuit means may be provided in various alternative embodiments, but preferably includes an excitation voltage source 104 for providing an excitation voltage 106 to a modulation means 108. Modulation means 108 may comprise a relay such as a solid state relay which switches on and off at an oscillation rate established by an oscillation signal 110 generated by an oscillator signal source 112. In general, additional details of the block diagram components of FIG. 4 need not be recited in detail, since various alternatives therefor are well understood by those of ordinary skill in the art, and may be alternatively practiced within the spirit and scope of the present invention as selected by such persons.

Such transmit circuit means including voltage source 104, modulation means 108, and oscillator signal source 112 may be provided for each primary coil 24 (i.e., for each detector head 12). In those embodiments where a multiple detector head configuration is used, an alternative sequencing means 114 may also be provided for controlling a plurality of such transmit circuit means, or instead a single such transmit circuit means, for sequentially driving each detector head 12 in the multiple head configuration during respective pulse time periods. With use of the sequencing means, each primary coil is sequentially pulsed with a modulated drive signal 115 from either a common or its respective modulation means for a period preferably in a range from about 250 Hertz to about 500 Hertz. The modulation means 108 is modulated at a rate established by oscillator signal 110, preferably having an oscillator rate for example of about 250 Hertz. Thus, during its discrete pulse time period (which periods do not overlap for the respective detector heads under control of the sequencing means 114) the primary coil 24 is pulsed with a positive voltage preferably about every 2 to 4 milliseconds. Sequencing means 114 in effect controls application of modulated drive signal 115 (from whatever modulation means source: single or plural) to a selected primary coil 24 for a given detector head 12.

The level of the excitation voltage in the output of the modulation means or relay 108 is controlled so as to generate a fairly constant output level from primary coil 24. Since the physical relationship between primary coil 24 and its respective secondary coil or coils 100 is established by the support structure discussed above with reference to FIGS. 1-3, a particular induced voltage level in the respective secondary coils may be expected. The presence of metallic objects within the fields generated and existing in connection with such coils may be said to disrupt, disturb, or otherwise affect the voltage level induced in such secondary coils, as is understood and well known by those of ordinary skill in the art. Such detected disturbances or differences in induced voltage levels (compared to a reference) may be obtained and processed as indications of metallic objects within the vicinity of a given detector head.

In general, the circuitry operatively connected to secondary coils 100 in present FIG. 4 comprises receive circuit means for detecting differences between voltage levels induced in such secondary coils (from the electromagnetic radiation transmitted by their respective primary coil 24), and a predetermined reference voltage level established by means 116.

In particular, the induced voltage levels 18 are processed and amplified in an operational amplifier 120, such amplified voltage levels being recitifed within rectifier 122. The amplified, rectified voltage levels output by rectifier 122 as obtained from voltage levels induced in secondary coils 100 are fed via line 124 to a comparator 126 and a differential amplifier 128, both of which receive the above-mentioned predetermined reference voltage from reference voltage source 116.

The predetermined reference voltage is preferably in a range of about 2 to 15 volts, as is the DC voltage obtained from rectifier 122 for comparison sake. Furthermore, such predetermined reference voltage is selected in conjunction with the expected induced voltage level which would result in secondary coils 100 absent any interference or disruption from metallic objects in and around the vicinity of a given detector head 12. Therefore, any differences between such reference voltage and the DC voltage on line 124 may be detected by either comparator 126 or differential amplifier 128 for indicating the presence of such metallic objects.

Differential amplifier 128 is capable of directly driving a strip chart recorder 130 for a hard copy record of metallic object indication sensings. Alternatively, comparator 126 generally outputs a sensing signal 132 which in turn is received by a driver means 134 capable of driving at least one and possibly more indicator devices 136 and 138. A plurality of indicator devices is represented, with the understanding that various audible or visual signals for human perception, or even signals automatically triggering various automatic control systems, may be used, all without limitation to the present invention.

Comparator 126 and differential amplifier 128 may be variously adjusted for desired sensitivity levels. For example, the above-mentioned metallic object sensitivities my be achieved with the practice of the present invention with detected differences of several millivolts, such as for example at least 2 to 5 millivolts, triggering the output by comparator 126 of sensing signal 132 (with comparable operation by differential amplifier 128).

Those of ordinary skill in the art will understand that a plurality of receive circuit means may be provided for use with various alternative embodiments of the present invention depending generally on the number of detector heads utilized with each such embodiment. With respect to such various embodiments, it is further understood by those of ordinary skill in the art that different dimensions may be assigned to the generally square primary and secondary coils represented in present FIGS. 2 and 3.

In one preferred exemplary embodiment, relatively square primary coil 24 may be provided in approximately 3 feet by 3 feet construction, with each secondary coil 32-38 comprising an approximate 1 foot by 1 foot square coil construction. With such a construction, with each detector head comprising an approximate 3 foot by 3 foot section, a cumulative 72 square foot area may be scanned with an 8 head configuration, such as represented by present FIG. 1. Of course, alternative dimensions may be practiced in accordance with the present invention, so long as the secondary coils generally remain co-planar with the primary coil and axially inward from the periphery thereof in a mutually non-overlapping configuration.

Those of ordinary skill in the art will recognize numerous other modifications and variations which may be practiced in accordance with the present invention. For example, various alternative voltage levels and oscillator rates may be practiced. Moreover, alternative circuitry arrangements may be utilized for transmit circuit and receive circuit functions in conjunction with the primary/secondary coil configurations illustrated herewith. In any event, those of ordinary skill in the art will recognize that advantages flow from the use of such primary/secondary coil configurations, whether in single head or multiple head constructions.

Yet other variations may be practiced by those of ordinary skill in the art without departing from the spirit and scope of the present invention. For example, the PVC pipe illustrated in present FIGS. 2 and 3 need not be water tight when used in underwater embodiments, though such feature is generally preferred. Transmit and receive circuit means may be received (water-tight) on support structure 14, or situated relatively remove therefrom on or within the powered vehicle 16. Also, the 1×8 planar array of present FIG. 1 may be modified for different "n" number of detector heads, or for other arrays such as 2×8, 4×8, or 4×6, all with various separation between adjacent detector heads.

In any event, those of ordinary skill in the art will appreciate that the foregoing specification describes exemplary embodiments of the present invention by using language of description and example only and not language of limitation, which is found only in the appended claims.

What is claimed is:

1. An induction-type metal detector apparatus, comprising:
   a primary coil;
   transmit circuit means connected to said primary coil for controllably outputting electromagnetic radiation therethrough;
   a plurality of secondary coils, disposed within the vicinity of said primary coil, and having voltages induced therein by electromagnetic radiation from said primary coil;
   means for establishing a predetermined reference voltage level;
   receive circuit means, connected to said secondary coils, for detecting differences between voltage levels induced in said secondary coils and said predetermined reference voltage level, which difference is due to and indicative of the presence of metallic objects in the vicinity of said apparatus because such presence affects said electromagnetic radiation; and
   support means for supporting said primary coil and said secondary coils substantially in a common plane with all secondary coils being disposed within the periphery of said primary coil, and in a mutually non-overlapping configuration.

2. An apparatus as in claim 1, wherein said transmit circuit means includes:
   an excitation voltage source providing an excitation voltage;
   an oscillator signal source providing an oscillator signal; and
   modulation means for modulating said excitation voltage with the oscillation rate from said oscillator signal to provide a modulated drive signal for driving said primary coil.

3. An apparatus as in claim 2, wherein:
   said modulation means comprises a solid state relay device which switches on and off at said oscillation rate of said oscillator signal; and
   said oscillator signal has an oscillation rate of about 250 Hertz;
   whereby said modulation means pulses said primary coil with a positive voltage about every two milliseconds.

4. An apparatus as in claim 1, wherein said receive circuit means includes:
   amplifier means for amplifying voltages induced in said secondary coils;
   rectifier means for rectifying such amplified voltages from said amplifier means;
   comparator means, associated with said means for establishing a predetermined reference voltage level, for comparing such reference voltage level with such amplified, rectified voltage levels from said rectifier means based on voltage levels induced in said secondary coils; and
   driver means, operatively associated with said comparator means, for outputting at least one sensing signal indicative of voltage level differences detected by said comparator means exceeding a predetermined amount, said sensing signal further being indicative of variations in the voltage level induced in said secondary coils relative a constant output level of said primary coil due to the interfering presence of metallic objects around the fields between said primary coil and said secondary coils.

5. An apparatus as in claim 4, wherein:
   said amplifier means includes operational amplifiers for amplifying induced voltage levels up to at least several volts; and
   said predetermined amount of voltage level differences is at least in a range of from about 2 millivolts to about 5 millivolts.

6. An apparatus as in claim 5, further comprising differential amplifier means, responsive to said amplified, rectified voltage levels from said rectifier means based on voltage levels induced in said secondary coils and to said predetermine reference voltage level, for driving a strip chart recorder to provide a hard copy output of metallic object sensing indications.

7. An apparatus as in claim 1, wherein:
   said coil comprises a planar loop about the periphery of said apparatus and symmetrical to the center thereof; and
   said plurality of secondary coils comprise substantially equi-sized planar coils disposed within the periphery of said apparatus and symmetrical about the center thereof.

8. An apparatus as in claim 1, wherein said support means comprises an elongated, non-metallic structure for co-planar support of a plurality of primary/secondary coil combinations, whereby metal detector operations are achieved over a relatively enlarged area.

9. An apparatus as in claim 8, further including synchronizing means for causing sequential operation of modulation means for respective primary/secondary coil combinations to prevent interference therebetween, such combinations also being at least slightly separated from one another edge-to-edge to further prevent interference.

10. A multi-head metal detector device, comprising:
an array of plural transmit-sense heads, each head having respective transmit and sense winding portions;
transmit circuit means for controllably pulsing at different times respective transmit winding portions for each of said heads;
sensing circuit means for obtaining, processing, and outputting signals from the sense winding portions of each respective head induced therein by their respective transmit winding portions; and
comparator circuit means for comparing said signals output from said sensing circuit means for each of said respective heads with a predetermined reference signal, and for indicating differences of a predetermined amount therebetween, which differences are caused by the presence of metal objects within the vicinity of each respective head resulting in partial disruption of transmissions between a given transmit winding portion and its respective head sense winding portion;
wherein each of said heads is substantially planar, and has said transmit winding portion thereof generally about its periphery, with said sense winding portion thereof within said periphery; and wherein said sense winding portion includes at least four respective sensing windings disposed in a mutually non-overlapping configuration within the plane of their respective head.

11. A metal detector device as in claim 10, wherein:
said transmit winding portions each comprise a square primary coil situated generally about the periphery of its respective head; and
said sense winding portions each comprise four square secondary coils symmetrically disposed about the center of their respective transmit-sense head, with their sides aligned in parallel with adjacent sides of said square primary coil, said four secondary coils being connected in parallel such that three of the coils are aiding said primary coil and the one remaining secondary coil is opposing said primary coil, such wiring pattern establishing an induced signal signature for indicating the presence of metal within the vicinity of said transmit-sense head.

12. A metal detector device as in claim 11, wherein:
said primary coil is approximately 36 inches square and has 25 turns of AWG 18 wire; and
said secondary coils are each approximately 12 inches square and have 50 turns each of AWG 26 wire; and wherein
said metal detector device includes an array of 8 of said transmit-sense heads.

13. A metal detector device as in claim 10, wherein:
said signals output from said sensing circuit means and said predetermined reference signal are in a range from about 2 volts to about 15 volts;
said predetermined amount of differences indicated by said comparator circuit means is at least about 2 millivolts; and
said transmit-sense heads are approximately 3 feet square, with adjacent transmit-sense heads in said array being separated by a predetermined amount of approximately 6 inches.

14. A multi-coil, multi-head pulse induction metal detection system, comprising:
generally non-metallic support structure for supporting an array of a plurality of substantially planar detector heads in co-planar alignment, each such detector head having a primary coil disposed within its plane and about the periphery thereof for transmitting signals therefrom upon being pulsed, and a plurality of secondary coils also disposed within its plane for receiving signals transmitted from its respective primary coil, said secondary coils being symmetrically supported about the center of their respective detector head axially inward from its periphery and without overlapping one another;
sequential transmit means for sequentially pulsing the primary coil of each respective detector head in discrete pulse time periods so that there is no overlap of pulse time periods for the respective heads; and
secondary coil sensor means, operatively associated with said detector heads, for indicating differences between signals received by secondary coils of each respective detector head and a predetermined reference signal, such differences indicating the presence of metallic objects relatively near such detection head;
wherein said co-planar alignment of said detector heads is generally in a 1×n array of such heads, with n being the number of such heads, whereby in general a relatively large area may be scanned at a given time across the n width of said array.

15. A metal detection system as in claim 14, wherein said support structure comprises plastic materials, adapted for being supported on a powered vehicle for movement therewith.

16. A metal detection system as in claim 15, wherein said plastic materials comprise a plurality of interconnected PVC pipes with substantially water-tight seals, with said primary coil and secondary coils being disposed within such pipes.

17. A metal detection system as in claim 14, wherein:
said sequential transmit means pulses primary coils with modulated signals of about 250 to 500 Hertz in discrete time periods lasting generally in a range from about 2 to 4 milliseconds; and
said detector heads are spaced in said array with respective lateral separation preferably of at least about 6 inches between adjacent heads;
whereby operation of said sequential transmit means and said lateral separation between said heads contribute to preventing operational interference between adjacent such heads, so that relatively larger scanning areas may be obtained with said multi-head metal detection system.

18. A metal detection system as in claim 14, wherein:
said secondary coil sensor means includes a plurality of sensing circuit means and paired respective comparator circuit means, one respective pair of such circuit means being operatively associated with each respective detector head for separately providing metallic object presence indications for each such head;

said primary coil for each detector head comprises a substantially square configuration; and said secondary coils for each detector head comprise substantially square configurations of smaller size than said primary coil so as to be received therewithin.

19. A metal detection system as in claim 14, wherein said n number of detector heads equals 8, with each detector head comprising an approximately 3 foot by 3 foot substantially square configuration, for a total of a 72 square foot scanning area for such 8 heads.

* * * * *